United States Patent
Green

[11] Patent Number: 5,823,749
[45] Date of Patent: Oct. 20, 1998

[54] VERTICAL-AXIS WIND TURBINE WITH TWO-PHASE SAILS

[76] Inventor: Robert R. Green, 1222 W. Grand Ave., Chicago, Ill. 60622

[21] Appl. No.: 756,729

[22] Filed: Nov. 26, 1996

[51] Int. Cl.[6] .................................................... F04D 29/26
[52] U.S. Cl. ...................... 416/132 B; 416/194; 415/2.1
[58] Field of Search .............................. 415/2.1, 4.1, 905, 415/907; 416/194, 132 AB

[56] References Cited

U.S. PATENT DOCUMENTS 802,144  10/1905  Harrington ........................... 416/194 A Primary Examiner—John T. Kwon

[57] ABSTRACT

A vertical axis wind turbine of the type having collapsible fabric sails (10) that reside on the rim of a horizontally disposed square rotor wheel (12,14) supported on a pivotally operated vertical mast (30). Four sails (10) are joined in oppositely disposed pairs and communicate by cables (16) through guides (18) that are positioned on a square rotor hub (14) and control the shape of the linked sails. When acted upon by wind, the sails reciprocally open and close to form two shapes. The two shapes are a scoop and a wing. The scoop holds the wind when receding from the wind. The advancing sail forms a wing that rides the wind promoting stability and reducing friction in the rotor wheel. The action of the advancing sail dampens the sail action of the opening sail and limits the opening sail to a preferred scoop shape.

8 Claims, 7 Drawing Sheets

VERTICAL-AXIS WIND TURBINE WITH TWO-PHASE SAILS

BACKGROUND ART

Windmill art has a long history. Toy windmills were described around 60 AD. Full scale use of wind power emerged in Persia in the $7^{th}$ century. Their axis was vertical but their blades rotated in a horizontal plane. The western windmill with its horizontal axis and blades rotating in a vertical plane was believed to be an independent invention from around the $12^{th}$ century.

The properties of this new blade orientation created complexities not encountered with the vertical shaft machines. The need for direction finding, speed control, complex transmissions, and intense lubrication are but a few of these complexities. Early windmills required almost a small gale for the blades to move steady and well. Continuous experimentation of the blade design, size, number, and configuration has sought the optimum compromise between mutually exclusive design criteria: good starting torque and high speed operation.

The art comprises past designs that have selectively diverged in function and could be categorized as: lift and drag machines. Lift machines having high speed operation with low starting torque, whereas the opposite is more the case for drag types.

High speed windmills present many challenges. Their blade design consists of two, or three thin air-foil wings revolving on a horizontal shaft, pivotally rotated on top of a tower. An exception to this design of high speed machines is the Darrieus, which revolves on a vertical shaft. The Darrieus is not self starting. High speed machines are used for electrical generation where low starting torque is less of a problem.

The energy derived from lift type systems is typically expensive. To utilize this free energy, one must not only buy and install a factory manufactured windmill and tower, but expensive batteries, inverters, controls, transmission cables, and appliances as well. These technically sophisticated machines are not without hazard. Storms and constant stress from buffeting create problems such as blade throw, ice throw, bearing failure, vibration, noise, and difficult and dangerous maintenance procedures. Most regulatory agencies require a substantial set-back schedule from buildings and roads owing to these well documented hazards.

Drag designs, including the Dutch four arms, multi-blade, and Savonius comprise the bulk of the art. They rely solely on the force of the wind against the blades to revolve the shaft. Drag machines typically have high solidity rotors with large, flat blades pitched in order to push the rotor in a given direction. They are usually large, permanent structures dedicated to a particular function, such as, raising water, sawing wood, grinding grain and cement; and have been traditionally used for producing oils, dyes, snuff, paint, paper, and textiles. Most of these functions have been taken over by more reliable and steady sources of power.

The transmission of power in the horizontal type is made unduly complex by the direction finding apparatus, whereby the head must be free to rotate with the direction of the wind. Any direct mechanical means of delivering power to the ground must avoid causing the head to rotate out of the wind when resistance is encountered during work loading. Typically the transmission is a complex device involving numerous parts that increase friction and maintenance.

The Savonius Rotor, or 'S' rotor, has overcome much of this complexity as a result of its vertical shaft design. It has also eliminated the need for direction finding and over-speed controls required of the previously described machines. Apart from these improvements it has some serious drawbacks. Evidence for these drawbacks can be found in its failure as a product. It has been available since 1925 but has never been manufactured, or marketed.

The Savonius design can be described as a barrel cut in half lengthwise and offset to form two scoops mounted on a vertical shaft. Two major deficiencies can be sighted in this design: (a), torque is unevenly distributed during operation, and (b), if it is improperly oriented to the wind, starting torque is zero. These problems can be partially alleviated by adding a second rotor in a stacked arrangement whereby the rotors are offset by ninety degrees. This improvement, however, creates additional problems associated with its weight, balance, and expense. In addition, the total swept area of the windmill remains low. Much of the power produced by the gathering side of the rotor is canceled by drag created by the other side. Some of this drag is reduced where the two sides of the buckets overlap, allowing some air to flow from the blade catching the wind to the one advancing into it.

Although there has been substantial effort to improve its efficiency, the Savonius design has not satisfied the need for a simple, low-tech solution for the problems it intended to eliminate. Wind speed of 5 meters per second is usually needed to supply ample power for pumping water from a 10 meter well. The cost and construction requirements remain much too high for the individuals who could best benefit from it. These individuals are typically people living in remote rural areas who need a reliable source of power for tasks critical to their well-being. Pumping water for the house and the livestock is an example of an obvious task, but other important tasks can be cited as well. Grinding grains, irrigating fields, draining swampy areas, washing clothes, and processing fiber are but a few examples of work that calls for a more flexible, portable, powerful, and reliable source of power. To be effective in this situation, a windmill must have high starting torque and be able to utilize low energy wind, as well as higher energy winds.

Further, windmills are typically complex and rely on sophisticated manufactured goods not readily available locally. They are heavy, permanent structures rigidly dedicated to both location and function. The tower, in most cases, interferes with the function by creating turbulence and obstruction. In the case of the Savonius, the tower must exceed the height of the rotor for top support. This condition severely limits the size of the rotor and adds to its cumbersome construction. Such windmills are one-dimensional in function and have limited utility.

SUMMARY OF THE INVENTION

The present invention is specifically directed to overcome the above-enumerated problems in a novel and simple manner. According to the invention, a wind propelled rotor is provided in conjunction with a mast for supporting, elevating, and conveying the energy from the rotor to the ground for useful work operations. The rotor comprises sails that open and close opposingly on a square wheel to alternately catch and ride wind as they rotate about a vertical shaft. The structure of the rotor consists of a square rotor wheel with a square hub that carries collapsible sails on each of four elongate rim members. The sails are linked in oppositely disposed pairs by cables and guides. The sails that are receding from the wind form scoops that reciprocally draw the advancing sails into a wing.

The object of the invention is to reduce drag on the advancing sails, create stability in the rotor by reducing turbulence, dampen the action of the inflating sails, and provide a rotor that is light enough to reside above the top supporting journal. All of these objects contribute to increased torque and swept area, resulting in greater power potential. Other objects and advantages of the present invention are:

(a) to provide a wind turbine with high starting torque.

(b) to provide a wind turbine that is economical to build and operate.

(c) to provide a wind turbine that can be scaled to meet desired power needs and prevailing wind conditions.

(d) to provide a wind turbine that is portable.

(e) to provide a wind turbine that can be built from locally obtained materials, with simple tools, by moderately skilled technicians.

(f) to provide a wind turbine that is versatile and multi-functional.

(g) to provide a wind turbine that can be dismantled and deployed quickly and easily by one, or two persons.

(h) to provide a wind turbine that may be operated safely near buildings and roads.

(i) to provide a wind turbine that is unobstructed and unrestricted by its tower.

(j) to provide a wind turbine that is self-regulating and omni-directional.

(k) to provide a wind turbine that facilitates the transmission of power for simple and direct utilization of wind energy.

(l) to provide a wind turbine that can utilize both low and high wind speeds.

Further objects and advantages will become apparent from a consideration of the ensuing description and drawings.

DRAWING FIGURES

DESCRIPTION OF THE PREFERRED EMBODIMENTS

Figure 1:
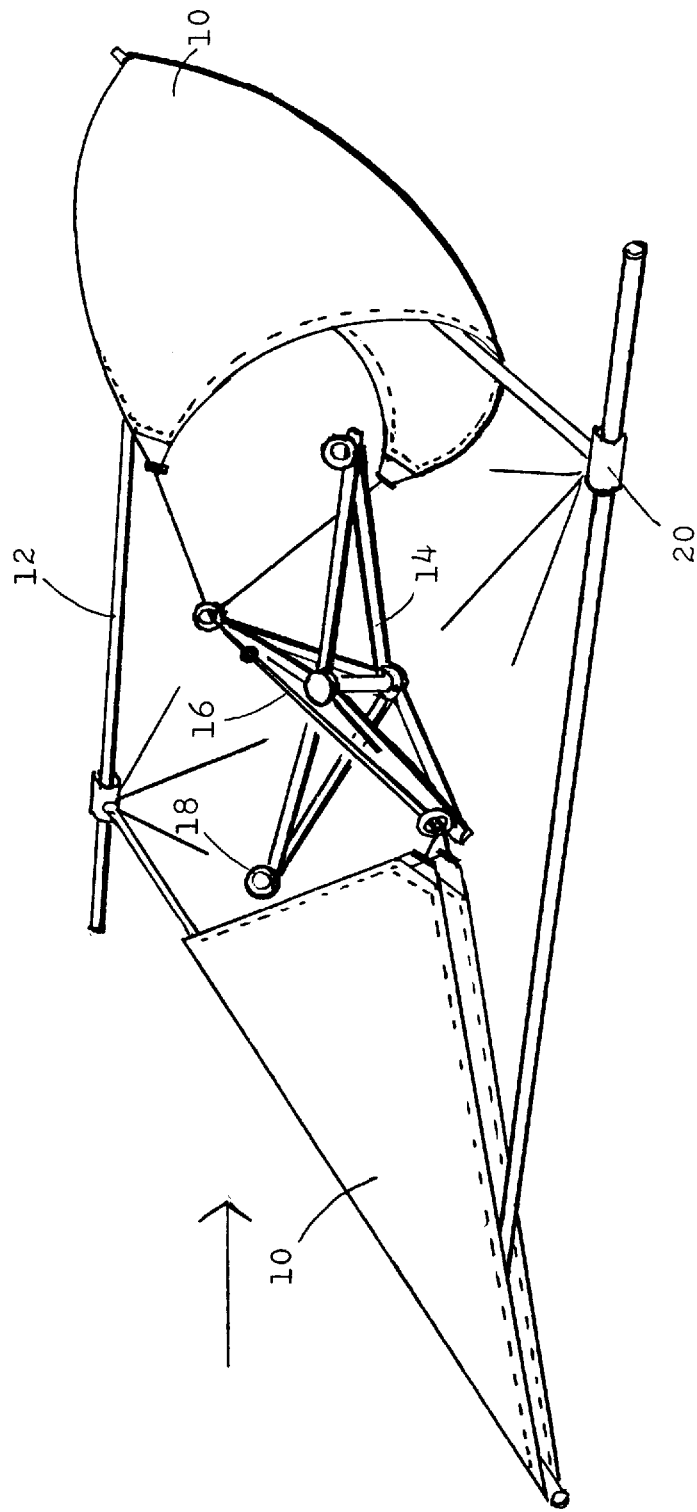
FIG. 1 is a fragmentary, perspective view of a wind turbine rotor assembly with two of its four sails removed for clarity.
Figure 2:
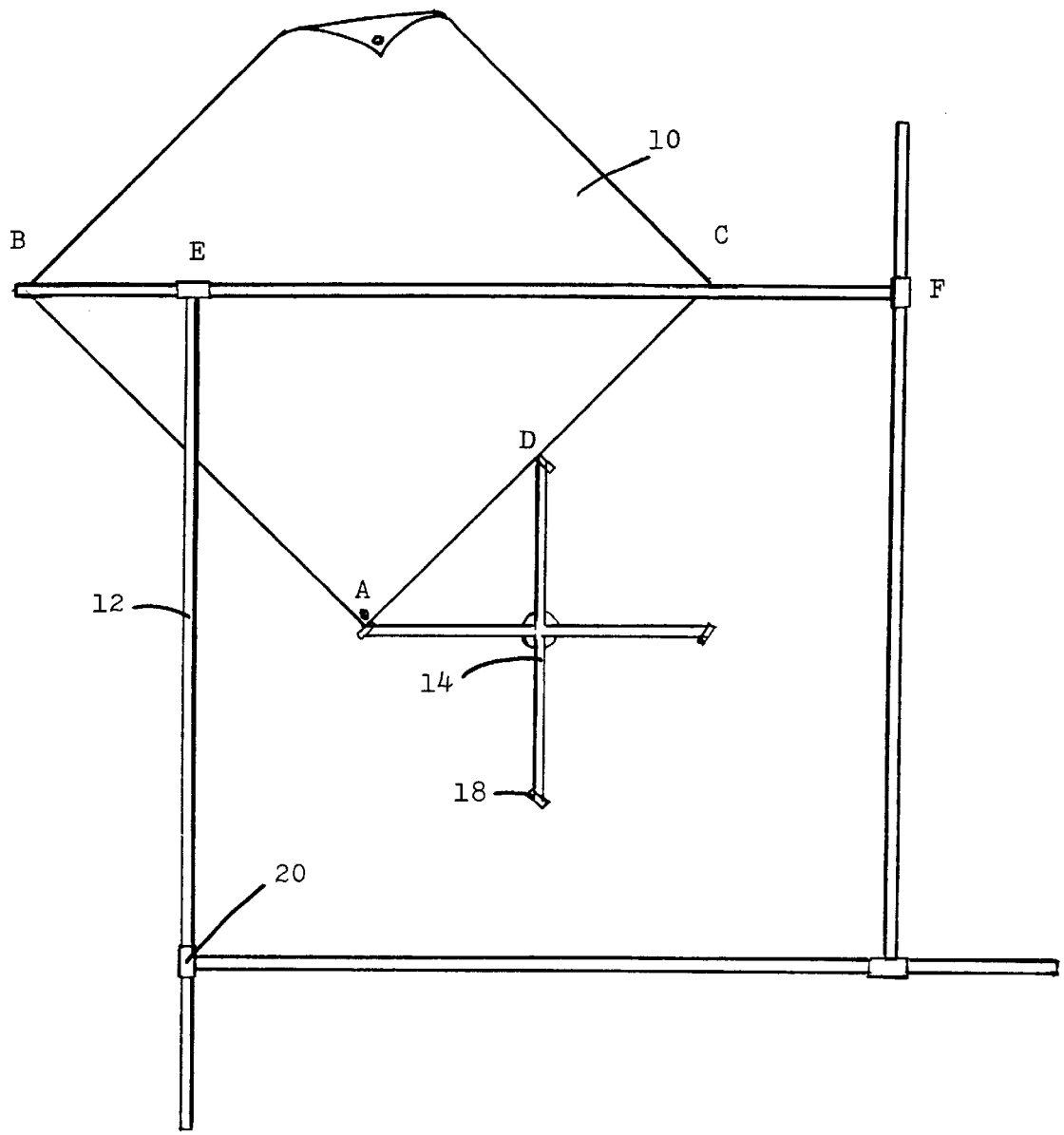
FIG. 2 is a fragmentary, top view of the rotor assembly showing three major components in their relative size and alignment.

FIGS. 1 and 2 are fragmentary views of the present invention that show the primary elements in their relative size and arrangement. FIG. 1 is a fragmentary, perspective view of the rotor with two of the four sails 10 in corresponding phases. The invention resides in the provision of sails 10 that open and close opposingly in conjunction with a frame structure 12, 14 that supports, controls, shapes and rotates the sails 10 on a vertical shaft, and transmits the energy to the ground through a shaft contained in a mast structure. The sails 10 are fastened to the rim members 12 by two of its diagonal corners. The two remaining diagonal corners are fastened to cables 16. The sails 10 communicate by the provision of the cables 16 and cable guides 18 to position and limit the open and closed phases.

FIG. 2 is a top view of the invention in its preferred form showing the relative size of the basic components of the rotor. The operation is dependent on the proportion and arrangement of the rim 12, hub 14, guides 18, and sails 10. The proportion and arrangement of these components remain consistent while the size of the complete rotor assembly can vary according to desired power and local wind conditions. The proportions are as follows: The sails 10 form a square and determine the size of the other components. The hub 14 forms a square with a cable guide 18 at each corner. The measurement of a side of the hub 18 (AD) is one half of a side of the sail 10 (AB). The rim 12 forms a square where the rim elements connect 20. The measurement between these points (EF) is the same as the diagonal measurement of the sail 10 (BC). The extended portion of the rim members (BE) measures one quarter of the diagonal measurement of the sail 10 (BC).

Specifications of a typical rotor are as follows: Sails 10 made from Dacron fabric with the dimension 2 m.×2 m. reside on a frame in which the hub 14 measures 1 m.×1 m. The rim 12 measures 2.828 m. between the rim connectors 20. The extended portion of the rim measures 0.7 m. The total length of a rim member is 3.52 m. Typically, rim 12 and hub 14 components are made of galvanized tubular steel (with diameters of 2.3 cm. and 1.8 cm. respectively) of the type commonly used for electrical conduit.

Figure 3:
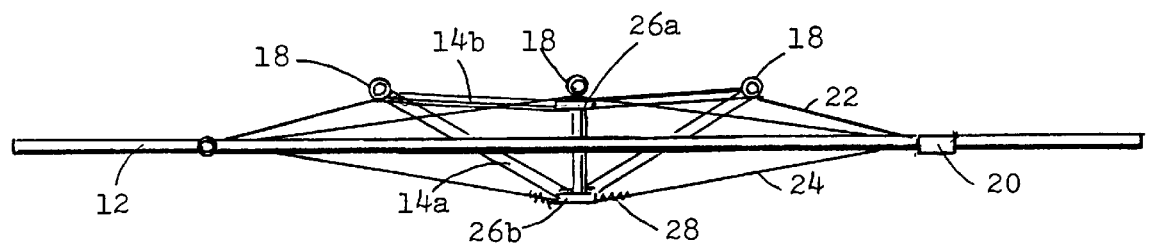
FIG. 3 is a side view of the rotor frame structure.
Figure 4:
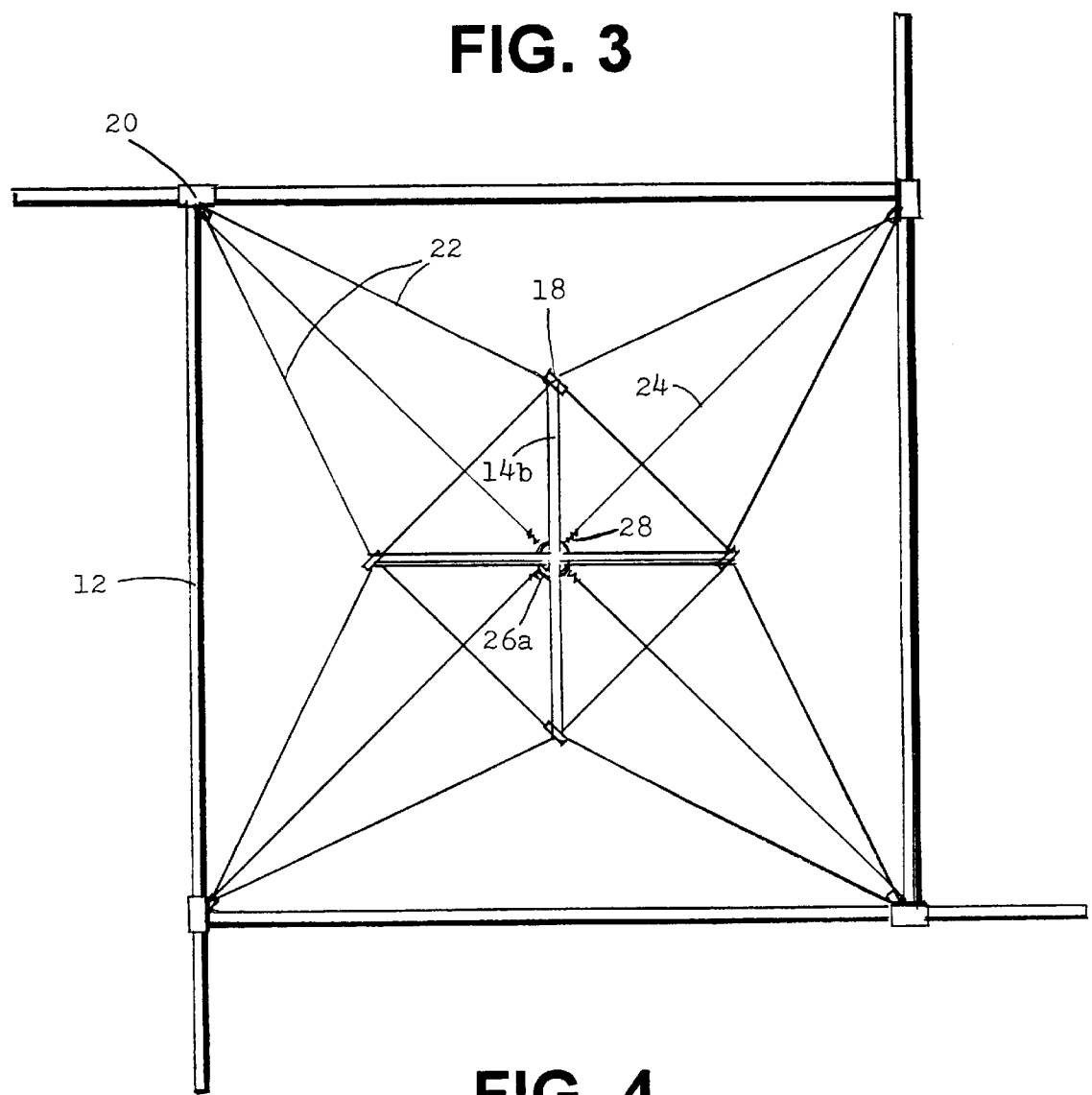
FIG. 4 is a top view of the rotor frame structure.

FIGS. 3–4 shows the frame structure in its preferred form, whereby the rim 12 is rotated forty-five degrees with respect to the hub 14 and is held in that position by a plurality of wire spokes 22–24. Upper spokes 22 radiate diagonally from the rim connection points 20 to the corners of the hub 14 and are secured by the cable guides 18. Four additional spokes 24 are provided to connect the bottom axle flange 26b to the rim connection points 20. These lower spokes 24 add vertical stability to the rotor structure. Turnbuckles 28 are provided on the lower spokes 24 to facilitate assembly and to adjust the tension of the upper 22 and lower 24 spokes. The spokes 22,24 are typically made of wire rope 3 mm. to 4 mm. in diameter.

Cable guides 18 at the four corners of the hub structure 14, are shown clearly in FIG. 1. The guides resemble eye-bolts that function as attachment points for the upper spokes 22, fasteners for the hub member 14, and guides for the positioning of the sails 10 during their open and closed phases.

The hub structure 14 consists of a vertical axle 26 with top 26a and bottom 26b flanges that provide center attachment points for cross tubes 14b and struts 14a. The upper cross 14b and lower struts 14a merge outward from the axle 26 and join to form a truss to support the cable guides 18 and upper spokes 22. The ends of these parts 14a, 14b are swaged to facilitate attachment.

Cables 16 emanating from the two inward corners of the sails 10 communicate through the eyes of the cable guides 18 to limit and shape its companion sail. To accomplish this, the cables must pass through diagonal guides 18 and have sufficient slack to allow appropriate opening of one sail and proper closure of the other. The reciprocal movement of the cable 16 as it responds to the opening and closing of the sails 10 is facilitated by a smooth rounded inner profile of the guides 18. Friction is further reduced by the provision of smooth slippery cables 16 made from a solid nylon material of the type commonly used in fish line and weed whips. These cables are typically about 2 mm. thick to insure sufficient strength. The cable guides 18 consist of a round loop, or hole with the stated smooth surface to prevent the cables 16 from abrading as they splay outward in response to the inflating sail. A bolt extending from the loop secures the guide 18.

Figure 5:
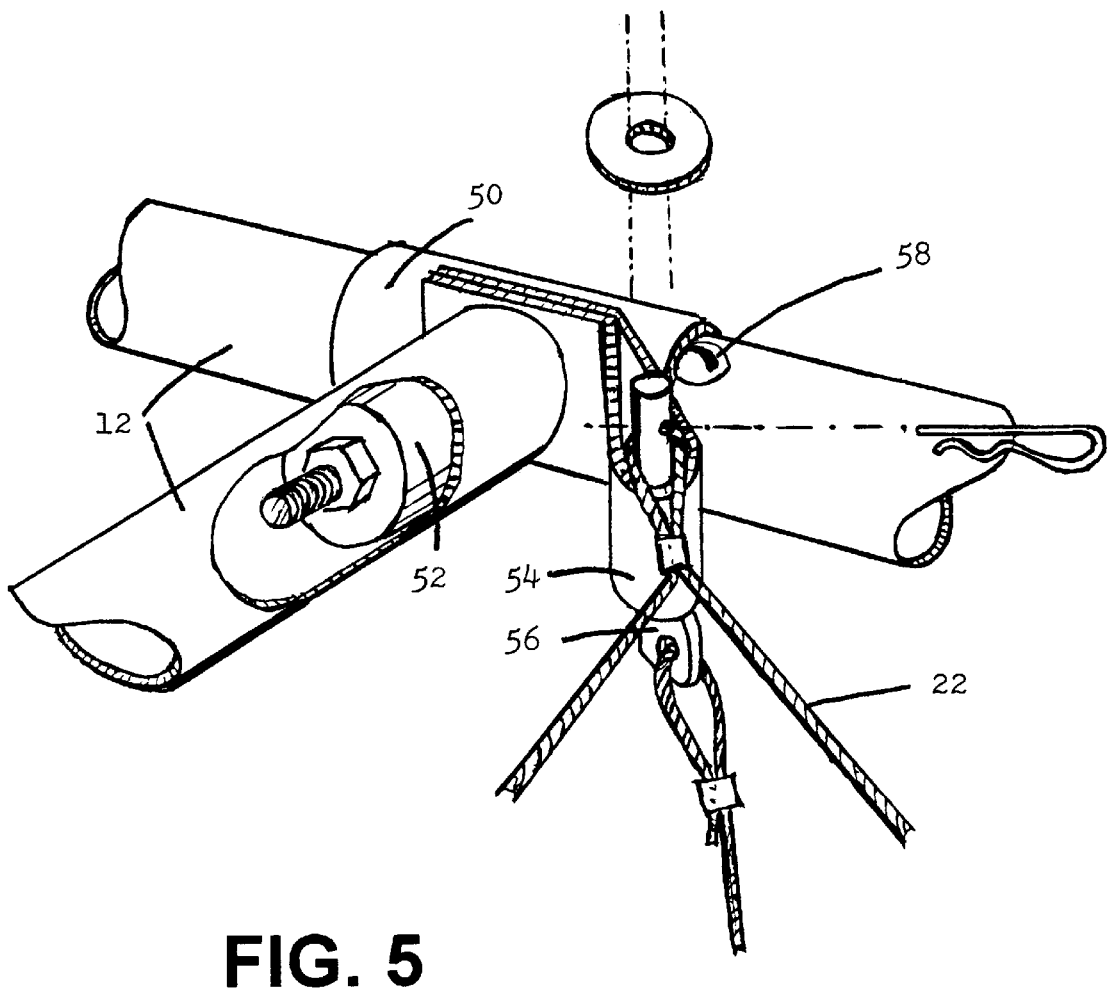
FIG. 5 is a perspective view of the rim attachment bracket.

According to the present invention, rim connectors 20 are provided, and are shown in detail in FIG. 5. The rim connectors 20 join the rim elements 12 together and provide a means for attaching the spokes 22,24. The preferred connector 20 consists of a retaining ring 50, a dowel 52, a spoke attachment bracket 54, and a spoke attachment pin 56. The retaining ring 50 is fastened at right angle to the dowel 52 and secured with a bolt projecting from the retaining ring 50 and running through the center of the dowel 52. The spoke attachment bracket 54 is sandwiched between the dowel 52 and the retaining ring 50, and projects outwards at forty-five degrees. The mating of the rim 12 is accomplished by sliding the retaining ring 50 onto the extended portion of the a rim 12 until it stops at the stop screw 58. The connecting rim element is placed onto the dowel 52. The attachment of the spokes to the spoke attachment bracket 54 by the spoke attachment pin 56 holds the adjacent rim members together. By permitting the rim members to twist, the rim connector 20 relieves stress associated with the operation of the rotor. A rigid, or fixed joint could eventually break.

Additional specifications of the rotor and mast (tower) will be described below.

The operation of the present invention is shown clearly in FIGS. 1, 5, 6, 7. When acted upon by wind, energy is produced in a vertical shaft to produce useful work. In the present invention, wind energy is converted to rotational motion by the provision of sails 10 that selectively open and close depending on their aspect to the wind. The action of the sails 10 is linked in pairs to control their corresponding shapes (FIG. 1).

The sails 10 are mounted on a lightweight, horizontally deposed frame 12,14 that rotates on a vertical axle 26. The open or inflated sail 10a, describes a scoop shape, while the closed or deflated sail 10c describes a thin planar profile that resembles a wing. The different drag characteristic of the two shapes causes the rotor to turn in a preferred direction.

The sails 10 are joined together in pairs (FIG. 1) by cables 16 that communicate through cable guides 18 to control, position, and limit the corresponding sails. The inflated sail 10a pulls on the cables 16 until its partner sail 10b is drawn tightly over the frame. In this way the two sails assume their preferred shape. The measurement of the cables is typically one and one half the diagonal measurement of the hub.

Figure 6:
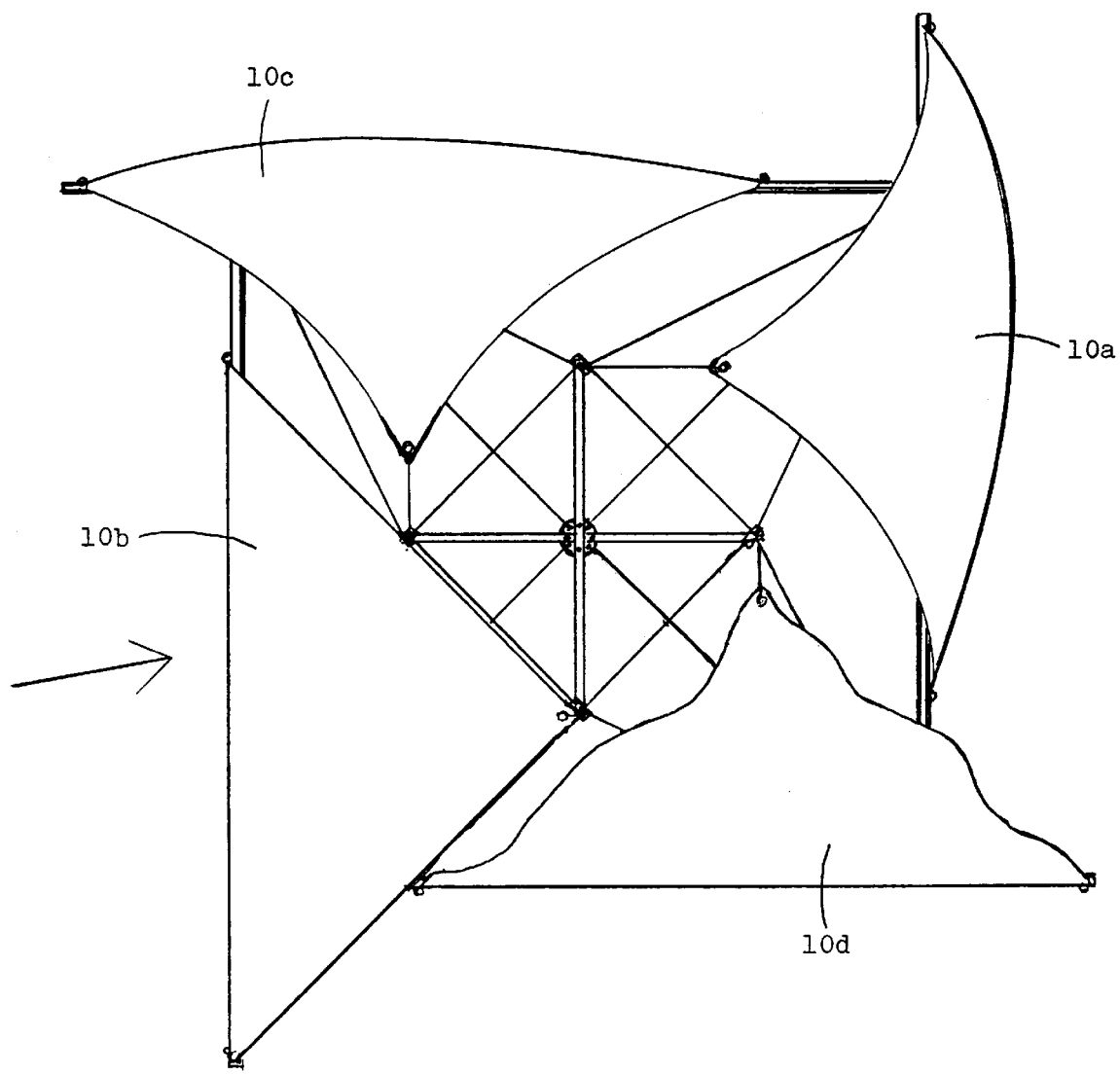
FIG. 6 is a top view of the wind turbine rotor assembly in its operating state that shows the sail phases of the rotor.
Figure 7:
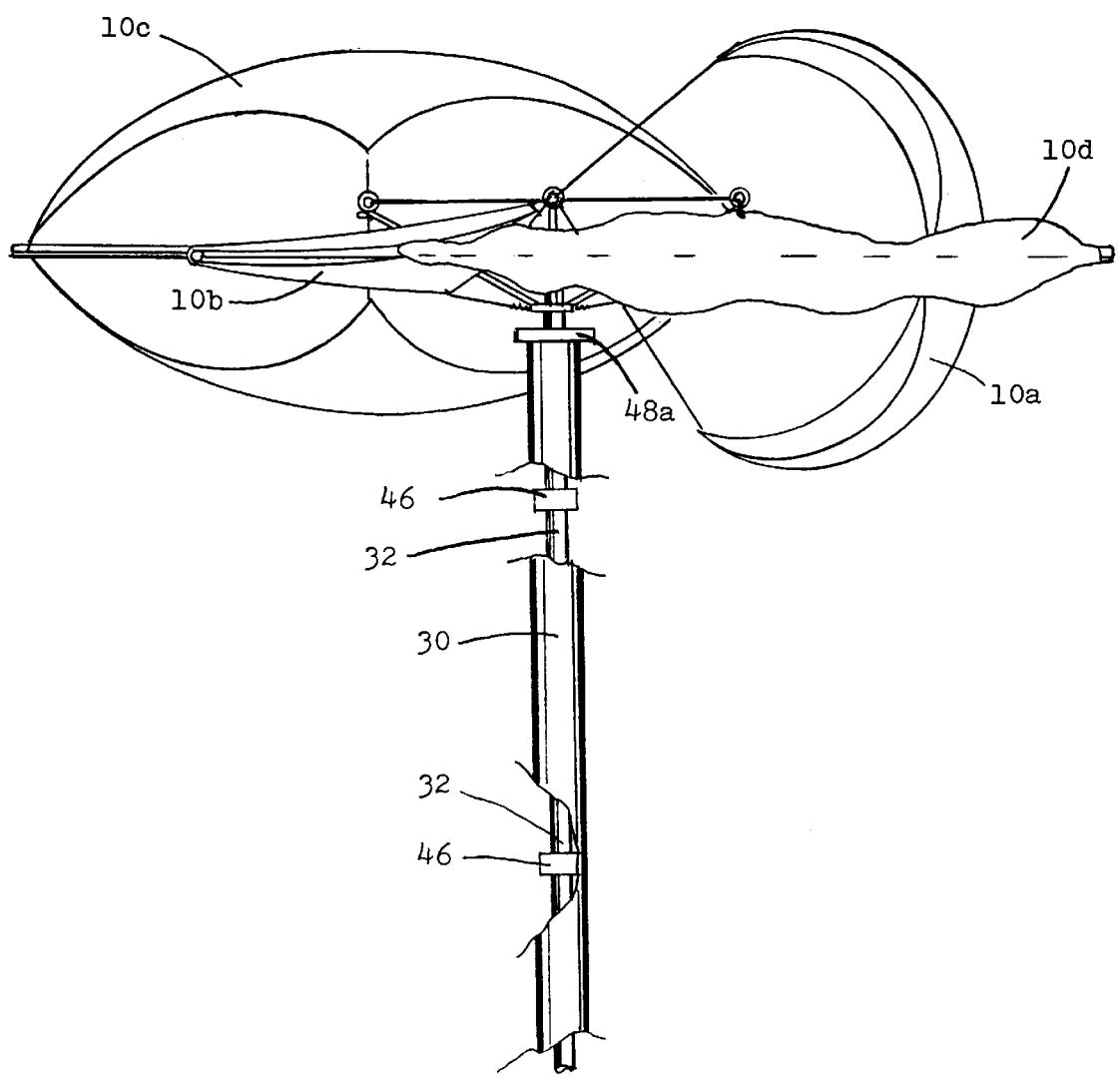
FIG. 7 is a perspective view of the wind turbine from the side in its operating state that shows the sail phases of the rotor, and a fragmentary view of the power shaft and mast.

FIGS. 6, 7 shows the sails in their respective phases. FIG. 6 is a top view of the rotor in its operating state where typical sail operations can be seen. Wind (indicated by the arrow) encounters each sail at a different angle as they rotate into and away from it. Receding sail 10a is completely inflated. Advancing sail 10d is partially deflated. Advancing sail 10b is fully deflated. Receding sail 10c is partially inflated.

FIG. 7 shows a perspective view of the wind turbine from the side in the same respective phases as in FIG. 6. It can be seen that sails 10a and 10b represent the optimum phase differential for the advancing 10b and the receding sails 10a. The advancing sail 10b has a significantly diminished drag with respect to the receding sail 10a. Because the phases of the sails overlap, the power output is smooth and steady.

Figure 8:
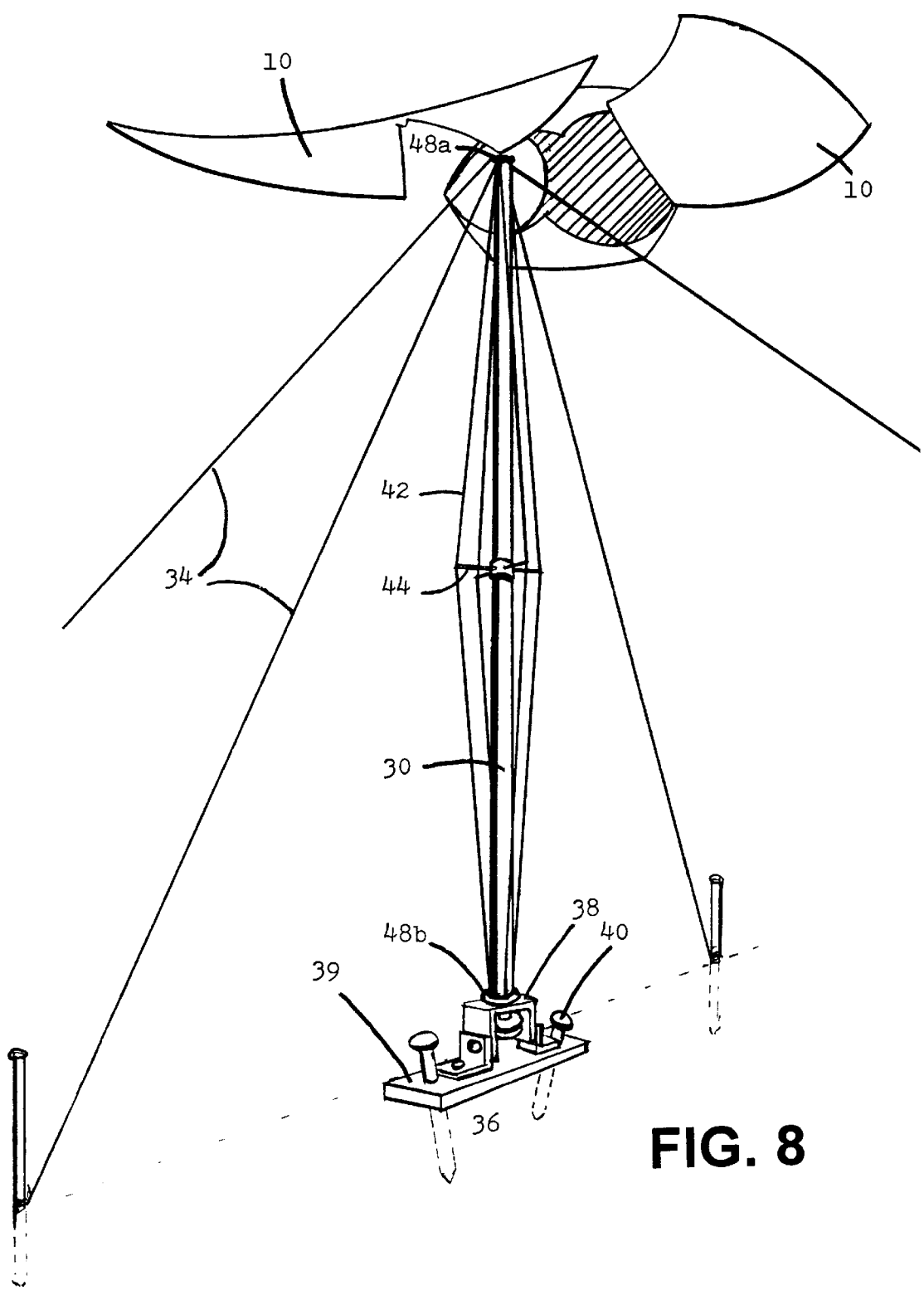
FIG. 8 is a perspective view of the wind turbine assembly in its operating state including the preferred mast arrangement.

FIGS. 7, 8 show the preferred embodiment of the wind turbine with its mast 30, transmission components and arrangements. The rotor is elevated and supported by a mast 30 made of two polyvinyl chloride (PVC) tubes approximately 10 cm in diameter and about 6 m in length when joined together. Antifriction devices 46 (FIG. 7), are provided within the tube at selected intervals, to carry the power shaft 32 to the base. The top portion (about 50 cm.) of the power shaft 32 is a solid steel shaft about 2.5 cm. in diameter with a threaded upper end. The threaded end extends beyond the top of the mast and is threaded into the bottom axle flange 26b of the rotor, thereby providing a means of attaching and detaching the rotor from the mast 30. Preferred direction of rotation and shaft threading must conform to prevent self-detachment during operation. The top two antifriction devices of the power shaft are tapered roller bearings and are situated near opposite ends of the solid upper portion of the power shaft 32. These bearings are faced in opposite directions in wooden, cylindrical blocks that carry the weight and lift exerted by the rotor.

To reduce weight, the lower portion of the power shaft 32 is a hollow steel tube (2.3 cm. dia.) through which energy is conveyed to the base of the mast 30 where it terminates with a drive pulley for power output 36. Wooden, or plastic blocks 46 with center plastic bushings, are spaced within the mast 30 at 1 to 1.5 meter intervals. These blocks 46 are positioned on the power shaft with top and bottom collars and are not fixed to the mast 30. With this arrangement, the bushings and shaft are installed or removed from the mast 30 as a unit. The bottom-most bearing is a more substantial ball, or roller bearing (not shown). The bearing blocks 32 of the upper tapered roller bearings and the bottom ball bearing are fastened to the mast 30 with screws that extend through the mast 30 and into the bearing blocks. Maintenance and assembly are achieved by removing these screws and extracting the power shaft.

The mast 30 terminates at both ends with a flange 48a, 48b (FIG. 8) upon which four wire braces 42 are attached. The mast braces 42 are stretched tightly between the two flanges 48a, 48b with turnbuckles (not shown). The wire braces are widened at the center of the mast by struts 44. These struts 44 reside on a coupling that joins the two halves of the mast 30. The mast 30 is made rigid and straight with this arrangement.

The bottom flange 48b is attached to a hinged foot 38 (FIG. 8) that allows the mast to be raised or lowered while maintaining a fixed footing. The hinge 38 consists of two inverted 'L' brackets welded, or bolted, to opposite sides of the bottom mast flange 48b. The down-turned legs of the 'L' have a hole near the bottom for a hinge pin. A second shorter 'L' bracket, with a hole in its upturned leg, is fastened to the foot board 39 adjacent to each leg. A hinge pin through the holes of the two 'L' brackets provides a pivot point from which the mast is raised. Stakes 40 driven into the ground through holes in the foot board 39, secure the footing.

The mast 30 is held in a vertical position by four guy wires 34 anchored to the ground. These guy wires 34 are fastened to the top mast flange 48a, and to stakes at four outward points on the ground. Two of these stakes are placed outward from the mast 30 on an imaginary line that runs though the hinge pins 41. The other two stakes are placed in the ground at 90 degrees from the center of this line. They should exceed in distance from the center line, the length of the mast and rotor from the foot board 39. Detachment of one of these two guy wires 34 from its stake, allows the mast to be pivoted downward for disengagement, removal to another location, or maintenance.

Disassembly of the mast is accomplished by the detachment of the wire braces 42 from the bottom flange 48b. The mast 30 can then be partially separated to reveal the power-shaft coupling (not shown). Once this power-shaft coupling is disconnected, the disassembly is completed. Portability of the entire wind turbine is facilitated because all of the major components are readily dismembered for transport.

Portability of the present invention permits relocation for irrigation, drainage, and seasonally changing work requirements. The flooding of separated rice paddies is an example of a task requiring portability. Drainage of remotely flooded low spots in a field is another example of this desirable advantage.

A variety of appliances may be implemented with a belt from the output pulley 36. Appliances, such as a water pump, flour mill, washing machine, and oil press, can be selectively powered by the wind turbine with simple installation procedures. Ample starting torque supplied by the wind turbine of the present invention precludes the need for complex gear reduction at the output end. Simpler, less costly appliances can be used as a result of a more direct hookup. Since the output is near the ground level, installation of appliances is facilitated.

Because the wind turbine described above is relatively slow moving, durable, quiet, and easily dismantled before hurricanes, it is suitable for operating near buildings and roads. For this reason it can be beneficial to people who live on small plots of land where wells are commonly located near houses.

It should be understood that the foregoing detailed description was made for the purpose of demonstrating the structure and operation of the invention with no unnecessary limitations to be understood therefrom.

Accordingly, the reader will see that the vertical shaft wind turbine of this invention can be used for a variety of tasks commonly performed by rural people throughout the world. A few of these tasks are: water pumping for households; irrigation; drainage; sewage processing; hydroponic gardening; grinding grain and cement; pressing oils and liquids; washing and processing fabrics and fibers; generating electricity; and any activity involving stirring, agitating, chopping, thrashing, and turning. Important advantages of the present invention include: (1) It is inexpensive to own and operate, (2) it is easy to manufacture and repair using locally obtained materials and craftpersons; (3) it is portable, (4) it is versatile and multi-functional; (5) it is amply powerful, utilizing a wide range of wind speeds; (6) it is quickly and easily deployed by one or two persons; (7) It is safe to operate near buildings and roads; (8) it is usable in areas with marginal wind resources and (9) it has convenient power hookup.

Although the description above contains many specifications, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A vertical axis wind turbine rotor assembly of the type supported by a rotary mast comprising:

a horizontally disposed substantially square rotor wheel residing above the top supporting journal of said rotary mast, said rotor assembly having substantially square sails constructed of flexible material, said sails operating in opositely disposed linked pairs alternately forming scoops to hold the wind when receding from the wind and forming wings to ride the wind when advancing into the wind, and moveable means linking said sails for reciprocally adjusting, shaping and supporting said sails on each revolution of the said rotor wheel; said movable means operated solely by the force of the wind.

2. A vertical axis wind turbine of claim 1 having an arrangement and embodiment including:

said rotary mast supporting a horizontal rotor wheel having four substantially square said sails of a flexible material diagonally folded around a substantially square said rotor wheel comprising four connecting elongate rim members supported by flexible spokes suspending from a substantially square hub having an arrangement providing means adjust said sails on said square hub whereby said means is arranged to reciprocally and alternately adjust said sails to form a scoop to hold the wind when receding from the wind, and a wing to ride the wind when advancing into the wind; said means actuated solely by the force of the wind, whereby friction and turbulence are reduced in the advancing said sail, and stability and rotary power are enhanced in the said rotor wheel.

3. The vertical axis wind turbine of claim 2 wherein said square hub is horizontally disposed and oriented forty five degrees relative to said square rim; said hub consisting of cross-braces and struts mounted above the top supporting journal on said rotary mast; said hub providing attachment points at the end of said cross-braces and said struts to attach said flexible spokes to suspend said square rim; said square hub having a dimension of substantially one-half the size of the square said sails.

4. The vertical axis wind turbine of claim 2 wherein said hub has a said sail guide at each corner of said hub; each said sail guide embodying an eye through which cables are threaded to link said sails; each said guide being spaced apart from adjacent said guide substantially one-half of the length of a side of the square formed by said sails.

5. The vertical axis wind turbine of claim 4 wherein said sails made of a flexible material are linked in oppositely residing pairs by separate movable cables attaching four inner corners of the paired said sails; said movable cables linking the top and bottom halves of said sails and communicating through diagonal said guides located on four corners of said square hub; separate said cables being joined at a point along their length approximately equal to one-half of the diagonal measurement of said hub; total measurement of said cables being approximately one and one-half times the diagonal measurement of said hub.

6. The vertical axis wind turbine of claim 5 wherein separate said cables are provided connecting the top and bottom halves of said sails; said cables communicating through said guides and having a measurement about equal to one and one-half times the distance between diagonally disposed said guides; said cables diverging outward with the inflating said sail and converging inward with the collapsing said sail whereby said guides, said cables and the arrangement therein provide means for shaping, controlling and supporting said sails; said means operated solely by the force of the wind.

7. The vertical axis wind turbine of claim 1 wherein said elongate rim members are joined at one end of each said rim member to adjacent said rim member at a connection point along adjacent said rim member substantially at a distance equal to the diagonal measurement of said sail; each said rim member having a portion of its total length extended beyond said connection point substantially one-quarter of the diagonal measurement of said sail; said rim members providing support and shape to said sails; said shape being the leading edge of a wing.

8. The vertical axis wind turbine of claim 7, further including: rim connectors at the junction of said elongate rim members providing a flexible joint; said rim connectors embodying:

(a) an elongate ring positioned on each said rim member, said positioning determined by a projection attached to each said rim member and equal to the diagonal measurement of the sail from said connection point;

(b) a receptacle projecting from one side of said elongate ring for capturing adjacent said rim member, said receptacle permitting limited rotation of said captured rim member; and (c) a pivotally rotating bracket for the attachment of flexible spokes; this embodiment providing means attach each said rim member and said spokes in an arrangement affording limited, independent rotation of said rim members and said spokes.

\* \* \* \* \*